United States Patent
Oh et al.

(10) Patent No.: US 8,744,740 B2
(45) Date of Patent: Jun. 3, 2014

(54) METHOD OF DETECTING LOCATION OF OPPOSING VEHICLE USING GPS INFORMATION

(75) Inventors: Young Chul Oh, Hwaseong-si (KR); Yoon Ho Jang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/538,773

(22) Filed: Jun. 29, 2012

(65) Prior Publication Data

US 2013/0151136 A1   Jun. 13, 2013

(30) Foreign Application Priority Data

Dec. 9, 2011   (KR) .......................... 10-2011-0131836

(51) Int. Cl.
*G01C 21/00* (2006.01)
(52) U.S. Cl.
USPC ...................................... 701/300; 342/357.34
(58) Field of Classification Search
USPC ...................................... 701/300; 342/357.34
See application file for complete search history.

(56) References Cited

U.S. PATENT DOCUMENTS

| 5,563,607 A * | 10/1996 | Loomis et al. ............ 342/357.44 |
| 2006/0087453 A1 * | 4/2006 | Iwane ........................... 340/988 |

* cited by examiner

*Primary Examiner* — Mary Cheung
*Assistant Examiner* — Yuen Wong
(74) *Attorney, Agent, or Firm* — Morgan, Lewis & Bockius LLP

(57) ABSTRACT

A method of detecting a location of an opposing vehicle using Global Positioning System (GPS) information in which pieces of GPS raw data and pieces of GPS post-processing data of a driver's vehicle and of an opposing vehicle are received. It is determined using the received GPS post-processing data whether the opposing vehicle is a vehicle that has entered a predetermined range. If it is determined that the opposing vehicle is a vehicle that has entered the predetermined range, it is determined whether common data is present in the pieces of GPS raw data of the driver's vehicle and of the opposing vehicle by comparing the pieces of GPS raw data with each other. A degree of proximity to the opposing vehicle is using the common data in the pieces of GPS raw data of the driver's vehicle and the opposing vehicle.

7 Claims, 2 Drawing Sheets

METHOD OF DETECTING LOCATION OF OPPOSING VEHICLE USING GPS INFORMATION

CROSS-REFERENCE TO RELATED APPLICATIONS

The present application claims priority of Korean Patent Application No. 10-2011-0131836 filed Dec. 9 2011, the entire contents of which application is incorporated herein for all purposes by this reference.

BACKGROUND OF INVENTION

1. Field of Invention

The present invention relates to a method of detecting the location of an opposing vehicle using Global Positioning System (GPS) information, which is intended to improve the precision of the relative locations of vehicles detected by a GPS using vehicle-vehicle communication.

2. Description of Related Art

Generally, a Global Positioning System (GPS) typically has an error of 5 to 15 m and may exhibit an error of up to a maximum of 30 m, so that a GPS does not satisfy the performance currently required by a typical vehicle safety technology.

Such a GPS has limitations when being provided with service in the converge of a reference station, and is problematic in that the location at which a commercial GPS correction signal is serviced is far away from the reference station, and thus the precision of location is not improved even if a GPS is used.

Further, since pieces of data about distances to a plurality of satellites measured by individual receivers include errors, it is impossible to calculate absolute coordinates, and the location information of the reference station is required in order to calculate a location. In this case, as the distance between the reference station and a receiver becomes longer, the errors inevitably increase.

Information received by the receiver from a GPS satellite may be raw data. Also, such information representatively includes the Pseudo Random Noise (PRN) code of a GPS satellite, the coordinates of the GPS satellite, and the distance between the GPS satellite and a reception module.

A GPS receiver performs post-processing using the raw data, and can detect the current coordinates on the map of the receiver using post-processing. However, as described above, the raw data itself already contains an error, and a computational error contained in the receiver itself is also included in errors depending on the type of receiver, with the result that the range of errors in the final data is inevitably widened.

Meanwhile, in recent vehicles, supplementary services have been developed in which various types of detection sensors are attached and which cope with collisions in advance or autonomously drive the vehicles by calculating the proximity to an opposing vehicle using the sensors.

However, in order to provide such a supplementary service, various types of sensors and a controller must be installed, and the calculation and prediction procedure thereof is complicated, thus making it difficult to commercialize the supplementary service. Accordingly, it is relatively simple to detect the movement of an opposing vehicle using GPS information.

However, it is difficult to use a GPS itself for the detection of an opposing vehicle because a large number of errors may be present when conventional GPS information is used.

Accordingly, a technology for more precisely detecting the movement of an opposing vehicle by reducing the errors in GPS information is required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of detecting the location of an opposing vehicle using Global Positioning System (GPS) information, which can improve the precision of the relative locations of vehicles detected by a GPS using vehicle-vehicle communication.

Various aspects of the present invention provide for a method of detecting a location of an opposing vehicle using Global Positioning System (GPS) information, including a) receiving pieces of GPS raw data and pieces of GPS post-processing data of a driver's vehicle and of an opposing vehicle; b) determining using the received GPS post-processing data whether the opposing vehicle is a vehicle that has entered a predetermined range; c) if it is determined that the opposing vehicle is a vehicle that has entered the predetermined range, determining whether common data is present in the pieces of GPS raw data of the driver's vehicle and of the opposing vehicle by comparing the pieces of GPS raw data with each other; and d) calculating a degree of proximity to the opposing vehicle using the common data in the pieces of GPS raw data of the driver's vehicle and the opposing vehicle.

Step d) may include, if common data is not present in the pieces of GPS raw data of the driver's vehicle and of the opposing vehicle, calculating a degree of proximity to the opposing vehicle using the pieces of GPS post-processing data of the driver's vehicle and of the opposing vehicle.

The GPS raw data may include a Pseudo Random Noise (PRN) code of each GPS satellite, coordinates of the GPS satellite, and a distance between the GPS satellite and a reception module of a relevant vehicle.

The GPS post-processing data may include a reception time and calculated coordinates on a map.

The predetermined range in b) may be determined based on a distance between and directions of the vehicles.

Step c) may be configured to, if the opposing vehicle is a vehicle that has entered the predetermined range, determine whether there is a satellite for which PRN codes among the pieces of GPS raw data of the driver's vehicle and of the opponent vehicle are identical to each other, by comparing the pieces of GPS raw data.

Step d) may be configured to calculate the degree of proximity to the opposing vehicle using GPS raw data of the satellite having a common PRN code among the pieces of GPS raw data of the driver's vehicle and of the opposing vehicle.

Step d) may be configured to calculate the degree of proximity to the opposing vehicle using GPS satellite coordinates of the satellite having the common PRN code and data about a distance between the GPS satellite and a reception module of a relevant vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
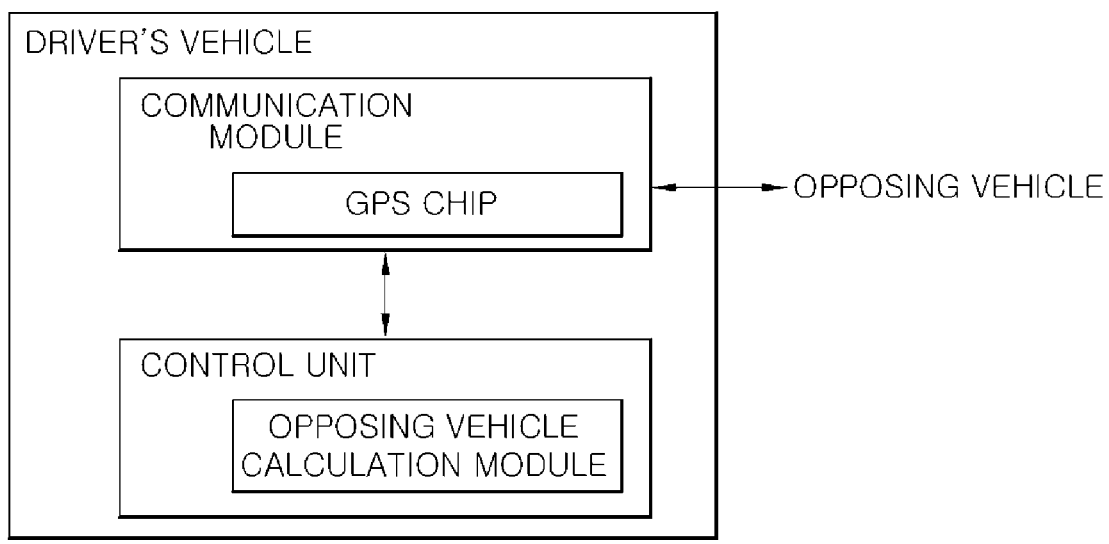
FIG. 1 is a diagram showing the construction of an exemplary system for performing an exemplary method of detecting the location of an opposing vehicle using GPS information according to the present invention.
Figure 2:
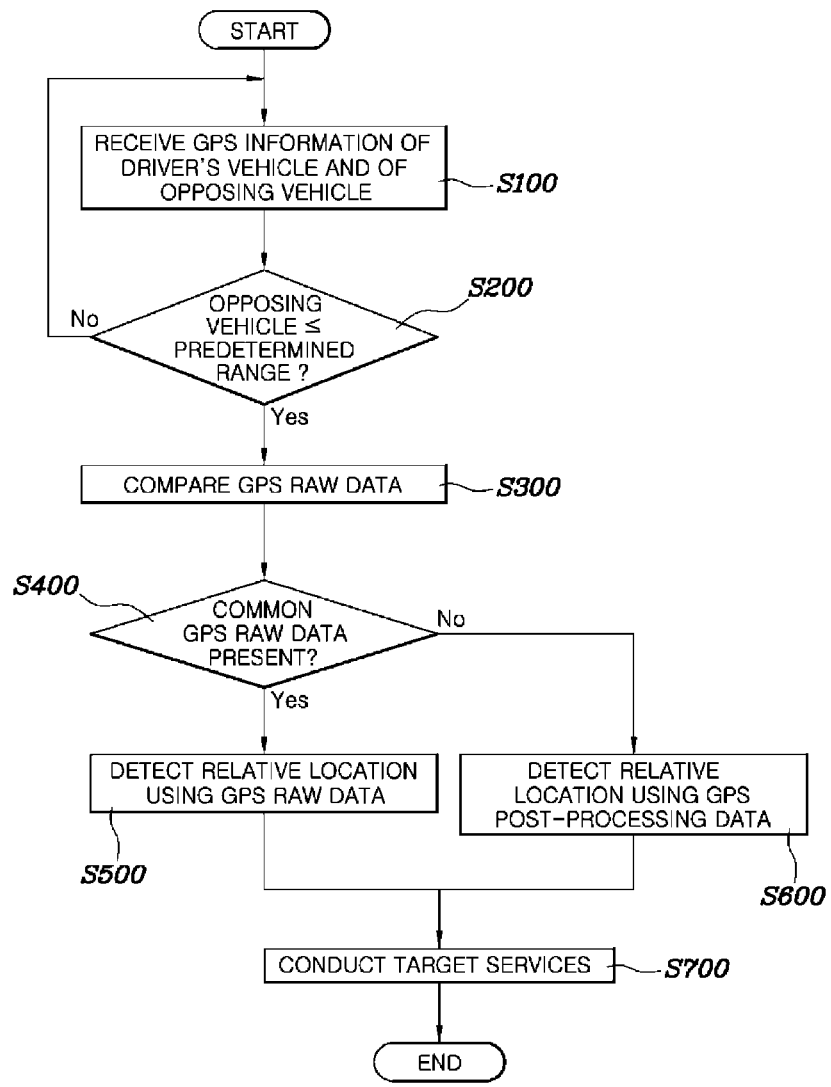
FIG. 2 is a flowchart showing an exemplary method of detecting the location of an opposing vehicle using GPS information according to the present invention.

FIG. 1 is a diagram showing the construction of a system for performing a method of detecting the location of an opposing vehicle using GPS information according to various embodiments of the present invention, and FIG. 2 is a flowchart showing a method of detecting the location of an opposing vehicle using GPS information according to various embodiments of the present invention.

The system for performing the method of detecting the location of an opposing vehicle using GPS information according to the present invention includes a communication module and a control unit. The communication module may include a chip for calculating locations using GPS information, and the control unit may include a calculation module for calculating a location relative to the opposing vehicle.

The method of detecting the location of an opposing vehicle using GPS information according to the present invention on the basis of the construction of the above system includes a reception step S100, a selection step S200, a comparison step S300, and an application step S500. In the reception step S100, pieces of GPS raw data and GPS post-processing data of a driver's vehicle and of an opposing vehicle are received. In the selection step S200, it is determined using the received GPS post-processing data whether the opposing vehicle is a vehicle that has entered a predetermined range. In the comparison step S300, if it is determined that the opposing vehicle is a vehicle that has entered the predetermined range, it is determined whether common data is present in the pieces of GPS raw data of the driver's vehicle and of the opposing vehicle by comparing the pieces of GPS raw data. In the application step S500, the degree of proximity to the opposing vehicle is calculated using the common data present in the pieces of GPS raw data of the driver's vehicle and of the opposing vehicle.

That is, the present invention uses the GPS information, received from the opposing vehicle via communication with the opposing vehicle, as well as the GPS information of the driver's vehicle. Here, both the raw data and the GPS post-processing data are received as the GPS information of the opposing vehicle.

Further, by using both the GPS post-processing data of the opposing vehicle and the GPS post-processing data of the driver's vehicle, the location of or the distance to the opposing vehicle is derived, and it is determined whether the opposing vehicle has entered the predetermined range.

During this procedure, since the detailed location of the GPS post-processing data which has been previously processed is used, searching is relatively rapidly performed even if a slight error is included.

If among various opposing vehicles, any vehicles entering the predetermined range are present, only these vehicles are selected and analyzed in detail. That is, whether common data is present in the pieces of GPS raw data of the driver's vehicle and of each opposing vehicle is determined by comparing the pieces of GPS raw data. By using the common data present in the pieces of GPS raw data of the driver's vehicle and of the opposing vehicle, the degree of proximity to the opposing vehicle is calculated in real time. Accordingly, the possibility that the opposing vehicle and the driver's vehicle will collide with each other or that the driver's vehicle will be put in a dangerous situation by the opposing vehicle may be detected.

When common GPS raw data is not present in the pieces of GPS raw data of the driver's vehicle and of the opposing vehicle, the method of the present invention may further include the sub-application step S600 of calculating the degree of proximity to the opposing vehicle using pieces of GPS post-processing data of the driver's vehicle and of the opposing vehicle.

Therefore, dangerous object groups are rapidly searched for using GPS post-processing data. Common data is extracted from the found object groups using the GPS raw data, and a detailed comparison is made on the common data, thus greatly reducing the amount of entire computation performed. Further, in the object groups, the common GPS raw data is used, so that absolute errors are removed, and relative errors are scarcely present.

That is, it may be believed that pieces of GPS information received by the receivers of the respective vehicles have absolute errors in their own ways. However, when the pieces of information are compared in relation to each other, errors which absolute values have as a concept contrary to relative values are mutually offset.

Further, the GPS raw data may include the Pseudo Random Noise (PRN) code of each GPS satellite, the coordinates of the GPS satellite, and the distance between the GPS satellite and the reception module of a relevant vehicle. The GPS post-processing data may include a reception time and calculated coordinates on the map.

Further, the predetermined range in the selection step S200 may be determined based on the distance between and the directions of the vehicles.

Meanwhile, in a method of making the detailed comparison with the opposing vehicle, the comparison step S300 is configured such that if the opposing vehicle is a vehicle that has entered the predetermined range, it is determined whether a satellite, for which the PRN codes among the pieces of GPS raw data of the driver's vehicle and of the opposing vehicle are identical to each other, is present by comparing the pieces of GPS raw data. Further, the application step S500 is configured such that the degree of proximity to the opposing vehicle is calculated using the GPS raw data of the satellite having the common PRN code among the pieces of GPS raw data of the driver's vehicle and of the opposing vehicle.

In detail, in the application step S500, the degree of proximity to the opposing vehicle is calculated using data, such as the GPS satellite coordinates of the satellite having the common PRN code and the distance between the GPS satellite and the reception module of a relevant vehicle.

That is, the term "common GPS raw data" denotes the data of satellites which receive data in common, among a plurality of common satellites, and makes it possible to discriminate the data of common satellites by comparing the PRN codes of the satellites in step S400.

Furthermore, if there are common satellites, the distance between the vehicles and the directions of the driver' vehicle and the opposing vehicle on the map may be derived using data of each of the common satellites, that is, "GPS satellite coordinates and the distance between the GPS satellite and the reception module of a relevant vehicle". Further, by means of the derived data, it is also possible to estimate the movement of the opposing vehicle with respect to the driver's vehicle in step S500.

Meanwhile, if there are no common satellites, there is no other alternative than to detect the location of the opposing vehicle using the pieces of GPS post-processing data of the opposing vehicle and of the driver's vehicle even if a slight error is accommodated for in step S600.

Therefore, as the relative locations of the driver's vehicle and the opposing vehicle have been detected, target services, such as providing a warning against a vehicle collision, autonomous driving, or the provision of a driving safety device, may be conducted in step S700.

As described above, according to the method of detecting the location of an opposing vehicle using GPS information having the above-described construction, the precision of the relative locations of vehicles detected by a GPS can be improved using vehicle-vehicle communication.

That is, the present invention detects the relative distance or locations by extracting only common data from the pieces of GPS information of the driver's vehicle and of the opposing vehicle, thus overcoming the limitation of inherent errors that inevitably exist in GPS information.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of detecting a relative location of an opposing vehicle from a driver's vehicle using Global Positioning System (GPS) information, comprising:
   a) receiving, by a communication module of the driver's vehicle, pieces of GPS raw data and pieces of GPS post-processing data of the driver's vehicle and of the opposing vehicle from GPS satellites, respectively;
   b) determining, by a control unit of the driver's vehicle configured to communicate with the communication module of the driver's vehicle, using the received pieces of GPS post-processing data acquired via communication between the driver's vehicle and the opposing vehicle by the communication module of the driver's vehicle whether the opposing vehicle has entered a predetermined range;
   c) if the control unit of the driver's vehicle determined that the opposing vehicle has entered the predetermined range, determining, by the control unit of the driver's vehicle, whether common data is present in the received pieces of GPS raw data of the driver's vehicle and of the opposing vehicle by comparing the received pieces of GPS raw data between the driver's vehicle and the opposing vehicle;
   d) if the common data is present in the pieces of GPS raw data of the driver's vehicle and of the opposing vehicle, calculating, by the control unit of the driver's vehicle, the relative location of the opposing vehicle from the driver's vehicle using the common data in the received pieces of GPS raw data of the driver's vehicle and the opposing vehicle; and
   e) if common data is not present in the received pieces of GPS raw data of the driver's vehicle and of the opposing vehicle, calculating, by the control unit of the driver's vehicle, the relative location of the opposing vehicle from the driver's vehicle using the received pieces of GPS post-processing data of the driver's vehicle and of the opposing vehicle.

2. The method according to claim 1, wherein the received pieces of GPS raw data comprise a Pseudo Random Noise (PRN) code of each GPS satellite, coordinates of the GPS satellite, and a distance between the GPS satellite and a reception module of a relevant vehicle.

3. The method according to claim 1, wherein the received pieces of GPS post-processing data comprise a reception time and calculated coordinates on a map.

4. The method according to claim 1, wherein the predetermined range between the driver's vehicle and the opposing vehicle in b) is determined based on a distance between the vehicles and directions of the vehicles.

5. The method according to claim 1, wherein in c) if the opposing vehicle is a vehicle that has entered the predetermined range, the control unit of the driver's vehicle determines whether there is a satellite for which PRN codes among the received pieces of GPS raw data of the driver's vehicle and of the opponent vehicle are identical to each other, by comparing the received pieces of GPS raw data between the driver's vehicle and the opposing vehicle.

6. The method according to claim 5, wherein in d) the control unit of the driver's vehicle calculates the relative location of the opposing vehicle from the driver's vehicle using GPS raw data of the satellite having a common PRN code among the received pieces of GPS raw data of the driver's vehicle and of the opposing vehicle.

7. The method according to claim 6, wherein in d) the control unit of the driver's vehicle calculates the relative location of the opposing vehicle from the driver's vehicle using GPS satellite coordinates of the satellite having the common PRN code and data about a distance between the GPS satellite and a reception module of a relevant vehicle.

* * * * *